US012736681B2

(12) United States Patent
Noguchi et al.

(10) Patent No.: US 12,736,681 B2
(45) Date of Patent: Sep. 15, 2026

(54) MONITORING SYSTEM, MONITORING DEVICE, MONITORING METHOD

(71) Applicant: NEC Corporation, Tokyo (JP)

(72) Inventors: Hidemi Noguchi, Tokyo (JP); Junichi Abe, Tokyo (JP)

(73) Assignee: NEC CORPORATION, Tokyo (JP)

(*) Notice: Subject to any disclaimer, the term of this patent is extended or adjusted under 35 U.S.C. 154(b) by 368 days.

(21) Appl. No.: 18/231,342

(22) Filed: Aug. 8, 2023

(65) Prior Publication Data

US 2024/0069202 A1 Feb. 29, 2024

(30) Foreign Application Priority Data

Aug. 25, 2022 (JP) ................................ 2022-134459

(51) Int. Cl.
*G01S 17/89* (2020.01)
*G01S 7/48* (2006.01)
*G01S 17/933* (2020.01)

(52) U.S. Cl.
CPC ............ *G01S 17/89* (2013.01); *G01S 7/4802* (2013.01); *G01S 17/933* (2013.01)

(58) Field of Classification Search
CPC ........ G01S 17/933; G01S 17/88; G01S 17/89; G01S 7/4802; G01S 17/42; B64F 1/002; G06T 17/00; G06T 2200/04; G06T 2207/10028
See application file for complete search history.

(56) References Cited

U.S. PATENT DOCUMENTS 9,383,753 B1 * 7/2016 Templeton ........... G05D 1/0246
11,461,963 B2 * 10/2022 Manivasagam ........ G06N 3/045
2010/0118122 A1 * 5/2010 Hartman .............. H04N 13/128 348/46

(Continued)

FOREIGN PATENT DOCUMENTS

CN 103577697 A 2/2014
CN 212735989 U 3/2021

(Continued)

OTHER PUBLICATIONS

JP Office Action for JP Application No. 2022-134459, mailed on Mar. 31, 2026 with English Translation.

*Primary Examiner* — Mohammad K Islam
(74) *Attorney, Agent, or Firm* — Sughrue Mion, PLLC

(57) ABSTRACT

A first point cloud acquisition unit controls a first fixed-point three-dimensional LiDAR scanner in such a way that the first fixed-point three-dimensional LiDAR scanner performs scanning in a low-density scanning range including a monitoring target in a scanning range and generates a low-density point cloud. An alignment unit aligns the low-density point cloud and known three-dimensional shape data about the monitoring target with each other. A scanning range determination unit determines a high-density scanning range including the monitoring target in a scanning range and also being narrower than the low-density scanning range, based on a result of the alignment by the alignment unit. A second point cloud acquisition unit controls the first fixed-point three-dimensional LiDAR scanner in such a way that the first fixed-point three-dimensional LiDAR scanner performs scanning in the high-density scanning range and generates a high-density point cloud.

10 Claims, 10 Drawing Sheets

(56) References Cited

U.S. PATENT DOCUMENTS

| | | | | |
|---|---|---|---|---|
| 2019/0391270 | A1* | 12/2019 | Uehara | G01S 17/04 |
| 2022/0101271 | A1* | 3/2022 | Steine | E01H 1/001 |
| 2022/0397676 | A1* | 12/2022 | Sharma | G08G 5/727 |

FOREIGN PATENT DOCUMENTS

| | | | |
|---|---|---|---|
| CN | 113064162 | A | 7/2021 |
| JP | 2022-510345 | A | 1/2022 |

* cited by examiner

MONITORING SYSTEM, MONITORING DEVICE, MONITORING METHOD

INCORPORATION BY REFERENCE

This application is based upon and claims the benefit of priority from Japanese patent application No. 2022-134459, filed on Aug. 25, 2022, the disclosure of which is incorporated herein in its entirety by reference.

TECHNICAL FIELD

The present disclosure relates to a monitoring system, a monitoring device, and a monitoring method.

BACKGROUND ART

An inspection of a runway at an airport is a main challenge when the airport is operated. A runway needs to be carefully inspected in such a way that an air traffic control can accurately recognize a situation of the runway.

A foreign body may be left on a runway. There are relatively large foreign bodies such as a dead body of an animal, and there are relatively small foreign bodies such as a part falling off an aircraft or a vehicle. The foreign bodies may explode a tire of an aircraft, and may cause fatal damage to a jet engine by being sucked into the jet engine. In order to avoid such a situation, an airport staff member regularly patrols a runway, and tries to find and remove a foreign body. However, a runway is extremely vast, and the regular patrol described above costs a lot.

Patent Literature 1 (Published Japanese Translation of PCT International Publication for Patent Application, No. 2022-510345) discloses an airport maintenance device that is equipped with a detection unit including a Lidar scanner and an X-ray camera and autonomously travels on a runway. The airport maintenance device removes or collects a foreign body when the detection unit detects the foreign body.

In the configuration in Patent Literature 1 described above, the airport maintenance device is required to patrol a runway, and thus the airport maintenance device itself may obstruct a takeoff and a landing of an aircraft. In other words, the airport maintenance device can patrol a runway only when a takeoff and a landing of an aircraft do not take place. However, at an airport where a takeoff and a landing of an aircraft frequently take place, a time between a takeoff and a landing is short, and thus a sufficient time for the airport maintenance device to patrol a runway cannot be secured between a takeoff and a landing.

In contrast, the inventors of the present application have considered that a runway is inspected by using a fixed-point three-dimensional LiDAR scanner. Since the fixed-point three-dimensional LiDAR scanner has a defect of a trade-off between a field of view (FOV) and a scanning time, there is a problem that the fixed-point three-dimensional LiDAR scanner is not suitable for inspecting a vast monitoring target in a short time.

SUMMARY

Thus, an object of the present disclosure is to provide a technique for inspecting a vast monitoring target in a short time by using a fixed-point three-dimensional LiDAR scanner.

The present disclosure provides a monitoring system including:

- a first point cloud acquisition means for acquiring a first point cloud (point group data, hereinafter also simply referred to as a PC) by controlling a fixed-point three-dimensional LiDAR scanner in such a way that the fixed-point three-dimensional LiDAR scanner performs scanning in a first scanning range including a monitoring target in a scanning range and generates the first point cloud;
- an alignment means for aligning the first point cloud and known three-dimensional shape data about the monitoring target with each other;
- a scanning range determination means for determining a second scanning range including the monitoring target in a scanning range and also being narrower than the first scanning range, based on a result of the alignment; and
- a second point cloud acquisition means for acquiring a second point cloud by controlling the fixed-point three-dimensional LiDAR scanner in such a way that the fixed-point three-dimensional LiDAR scanner performs scanning in the second scanning range and generates the second point cloud.

The present disclosure provides a monitoring device including:

- a first point cloud acquisition means for acquiring a first point cloud by controlling a fixed-point three-dimensional LiDAR scanner in such a way that the fixed-point three-dimensional LiDAR scanner performs scanning in a first scanning range including a monitoring target in a scanning range and generates the first point cloud;
- an alignment means for aligning the first point cloud and known three-dimensional shape data about the monitoring target with each other;
- a scanning range determination means for determining a second scanning range including the monitoring target in a scanning range and also being narrower than the first scanning range, based on a result of the alignment; and
- a second point cloud acquisition means for acquiring a second point cloud by controlling the fixed-point three-dimensional LiDAR scanner in such a way that the fixed-point three-dimensional LiDAR scanner performs scanning in the second scanning range and generates the second point cloud.

The present disclosure provides a monitoring method including, by a computer:

- a step of acquiring a first point cloud by controlling a fixed-point three-dimensional LiDAR scanner in such a way that the fixed-point three-dimensional LiDAR scanner performs scanning in a first scanning range including a monitoring target in a scanning range and generates the first point cloud;
- a step of aligning the first point cloud and known three-dimensional shape data about the monitoring target with each other;
- a step of determining a second scanning range including the monitoring target in a scanning range and also being narrower than the first scanning range, based on a result of the alignment; and
- a step of acquiring a second point cloud by controlling the fixed-point three-dimensional LiDAR scanner in such a way that the fixed-point three-dimensional LiDAR scanner performs scanning in the second scanning range and generates the second point cloud.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT (Overview of Present Disclosure)

Figure 1:
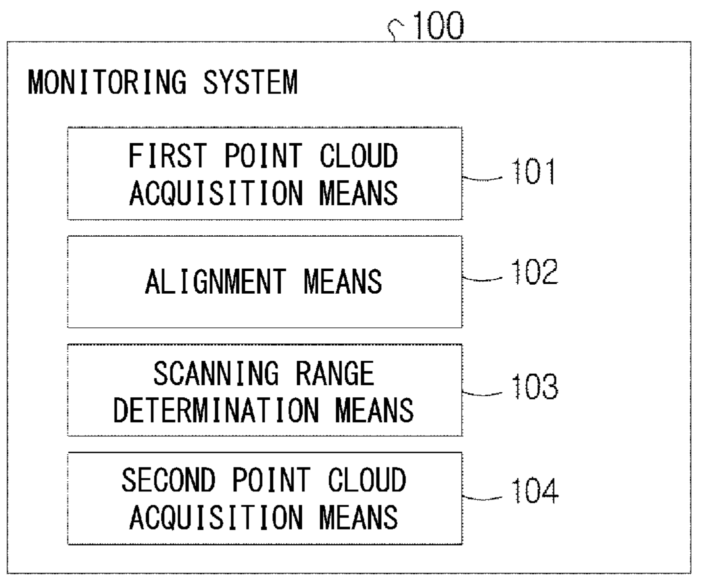
FIG. 1 is a functional block diagram of a monitoring system.

An overview of a monitoring system according to the present disclosure will be described below with reference to FIG. 1. FIG. 1 is a functional block diagram of the monitoring system.

As illustrated in FIG. 1, a monitoring system 100 includes a first point cloud (PC) acquisition means 101, an alignment means 102, a scanning range determination means 103, and a second point cloud acquisition means 104.

The first point cloud acquisition means 101 acquires a first point cloud by controlling a fixed-point three-dimensional LiDAR scanner in such a way that the fixed-point three-dimensional LiDAR scanner performs scanning in a first scanning range including a monitoring target in a scanning range and generates the first point cloud.

The alignment means 102 aligns the first point cloud and known three-dimensional shape data about the monitoring target with each other.

The scanning range determination means 103 determines a second scanning range including the monitoring target in a scanning range and also being narrower than the first scanning range, based on a result of the alignment.

The second point cloud acquisition means 104 acquires a second point cloud by controlling the fixed-point three-dimensional LiDAR scanner in such a way that the fixed-point three-dimensional LiDAR scanner performs scanning in the second scanning range and generates the second point cloud.

According to the configuration described above, a time required for scanning can be shortened by narrowing a scanning range while it is guaranteed that the second scanning range includes a monitoring target in a scanning range, and thus a vast monitoring target can be inspected in a short time by using a fixed-point three-dimensional LiDAR scanner.

First Example Embodiment

Next, a first example embodiment according to the present disclosure will be described with reference to FIGS. 2 to 11.

Figure 2:
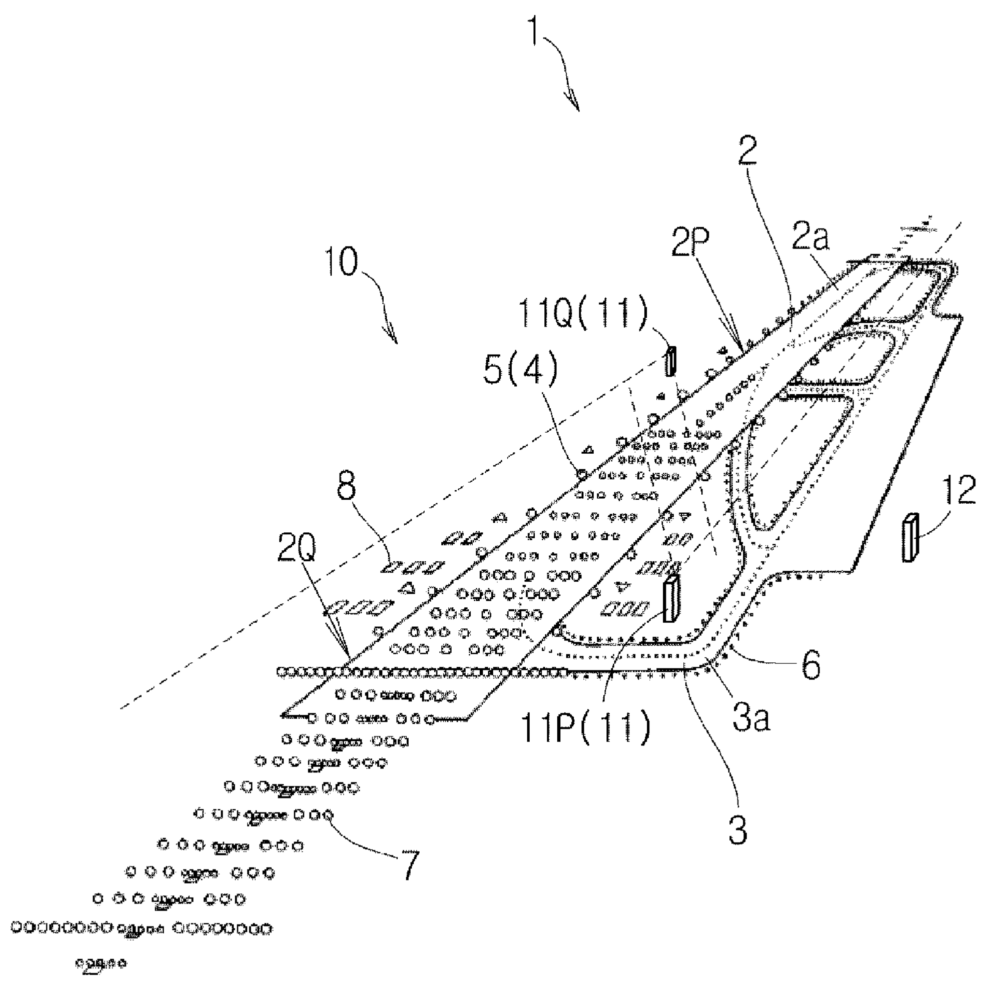
FIG. 2 is a bird's-eye view of an airport (first example embodiment)

FIG. 2 illustrates a bird's-eye view of an airport 1. As illustrated in FIG. 2, a runway 2 and a taxiway 3 are mainly provided at the airport 1. The runway 2 and the taxiway 3 are provided with a plurality of lights 4 for operating an aircraft. The plurality of lights 4 mainly include a plurality of runway lights 5, a plurality of taxiway lights 6, a plurality of approach lights 7, and a plurality of approach angle instruction lights 8.

The plurality of runway lights 5 are provided in such a way as to rim the runway 2 in order to make the runway 2 visually recognizable. The plurality of taxiway lights 6 are provided in such a way as to rim the taxiway 3 in order to make the taxiway 3 visually recognizable. The plurality of approach lights 7 are provided on an extension of the runway 2 in order to indicate a final approach path to the runway 2. The plurality of approach angle instruction lights 8 are provided on a side of the runway 2 in order to indicate whether an approach angle of a landing is good.

The lights 4 are typically provided in such a way as to protrude upward from a road surface 2*a* of the runway 2 and a road surface 3*a* of the taxiway 3 for visual recognition from a remote place.

A length of the runway 2 is typically from 2000 meters to 4000 meters. A width of the runway 2 is typically from 30 meters to 60 meters.

Then, a monitoring system 10 for monitoring the runway 2 and the taxiway 3 is provided at the airport 1. The monitoring system 10 includes a plurality of fixed-point three-dimensional LiDAR scanners 11 and a monitoring device 12.

In the present example embodiment, the plurality of fixed-point three-dimensional LiDAR scanners 11 include a first fixed-point three-dimensional LiDAR scanner 11P and a second fixed-point three-dimensional LiDAR scanner 11Q. The first fixed-point three-dimensional LiDAR scanner 11P monitors a first monitoring region 2P of the vast runway 2 being remote from the plurality of approach lights 7. The second fixed-point three-dimensional LiDAR scanner 11Q monitors a second monitoring region 2Q of the vast runway 2 being close to the plurality of approach lights 7. Hereinafter, monitoring of the first monitoring region 2P by using the first fixed-point three-dimensional LiDAR scanner 11P will be mainly described. Meanwhile, description of monitoring of the second monitoring region 2Q by using the second fixed-point three-dimensional LiDAR scanner 11Q is duplicate, and thus the description will be omitted.

In the present example embodiment, each of the fixed-point three-dimensional LiDAR scanners 11 adopts a time of flight (ToF) method as a distance measuring method. However, instead of this, each of the fixed-point three-dimensional LiDAR scanners 11 may adopt a frequency modulated continuous wave (FMCW) method or an amplitude-modulated continuous wave (AMCW) method as a distance measuring method.

The present example embodiment indicates the case where each of the fixed-point three-dimensional LiDAR scanners 11 adopts a raster scanning method as a scanning method for simplifying description. Note that the scanning method is not limited to the raster scanning method. For example, a conical scanning method that combines a plurality of wedge prisms may be adopted. Further, a scanning device including a narrow fine field of view (FoV) scanner and a revolving stage that pans and tilts the narrow FoV scanner itself may be used.

Figure 3:
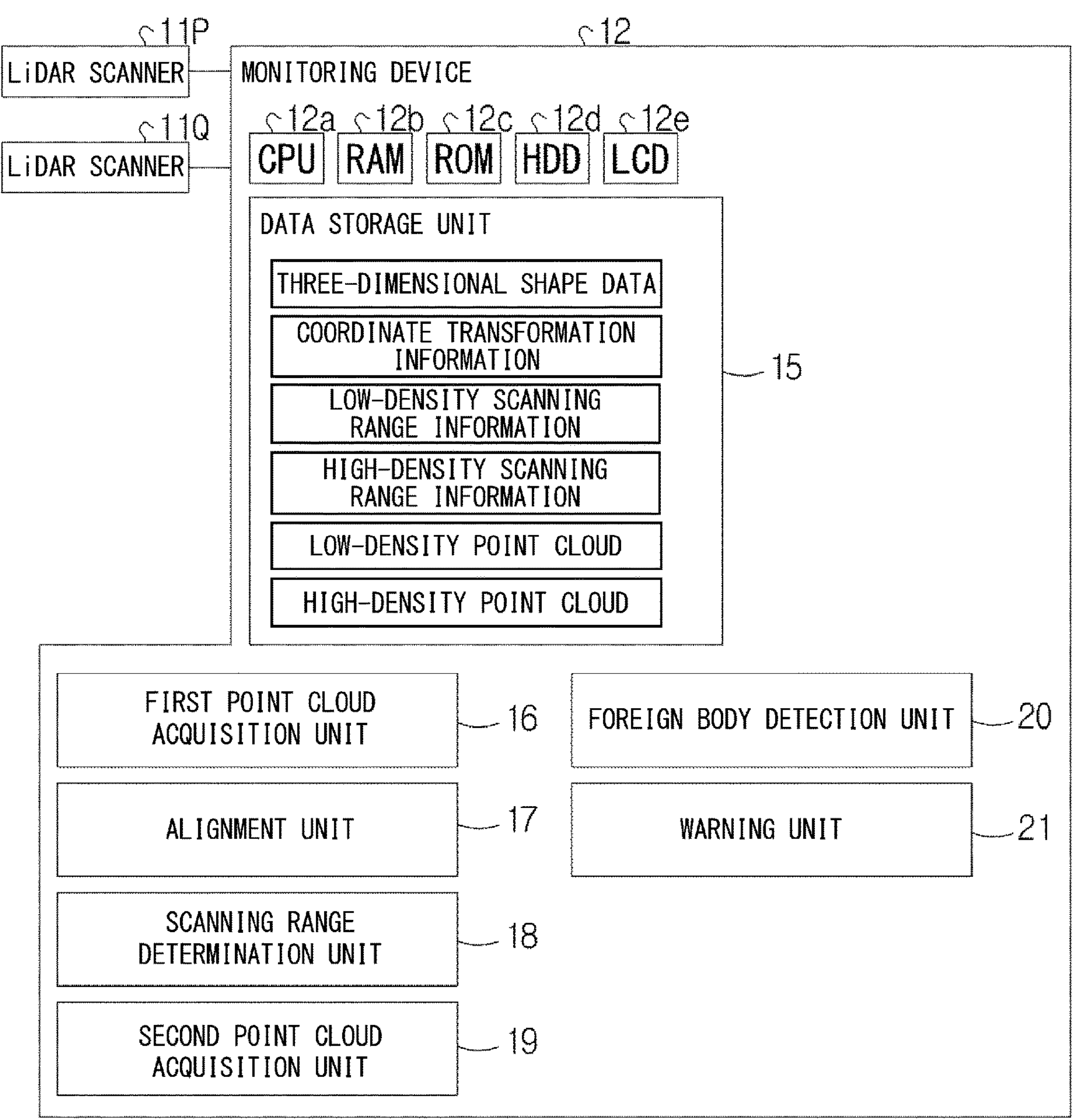
FIG. 3 is a functional block diagram of a monitoring system (first example embodiment)

As illustrated in FIG. 3, the first fixed-point three-dimensional LiDAR scanner 11P and the second fixed-point three-dimensional LiDAR scanner 11Q can bidirectionally communicate with the monitoring device 12. The monitoring device 12 includes a central processing unit (CPU) 12*a* as a central processor, a random access memory (RAM) 12*b* being writable and readable, and a read only memory (ROM) 12*c* designed for reading. The monitoring device 12 further includes a hard disk drive (HDD) 12*d* being an external storage device and a liquid crystal display (LCD) 12*e* as a display means.

Then, the CPU 12*a* reads and executes a control program stored in the ROM 12*c* and the HDD 12*d*. In this way, the control program causes hardware such as the CPU 12*a* to function as a data storage unit 15, a first point cloud acquisition unit 16, an alignment unit 17, a scanning range determination unit 18, a second point cloud acquisition unit 19, a foreign body detection unit 20, and a warning unit 21.

The data storage unit 15 stores three-dimensional shape data, coordinate transformation information, low-density scanning range information, high-density scanning range information, a low-density point cloud, and a high-density point cloud.

The three-dimensional shape data is known three-dimensional shape data about a monitoring target. The monitoring target includes at least the first monitoring region 2P of the runway 2 illustrated in FIG. 2. The monitoring target may include the plurality of lights 4 in addition to the first monitoring region 2P of the runway 2. In the present example embodiment, the monitoring target includes the first monitoring region 2P of the runway 2 and the plurality of runway lights 5 that rim the first monitoring region 2P. A data format of the three-dimensional shape data is typically mesh data formed of a plurality of polygons. However, instead of this, a data format of the three-dimensional shape data may be a point cloud. The three-dimensional shape data are created in advance based on a design diagram of a monitoring target, or are created in advance based on a measurement result of measuring a monitoring target by using a three-dimensional LiDAR scanner.

The coordinate transformation information is generated by an interactive closest point (ICP) matching algorithm or the like, and is typically formed of a rotation matrix and a translation matrix.

The low-density scanning range information defines a low-density scanning range in which the first fixed-point three-dimensional LiDAR scanner 11P performs scanning at a low scanning density. The low-density scanning range information is defined by a plurality of coordinate points in an XYZ coordinate system, or a deflection angle and an azimuth angle in a polar coordinate system.

The high-density scanning range information defines a high-density scanning range in which the first fixed-point three-dimensional LiDAR scanner 11P performs scanning at a high scanning density. The high-density scanning range information is defined by a plurality of coordinate points in the XYZ coordinate system, or a deflection angle and an azimuth angle in the polar coordinate system.

The low-density scanning range and the high-density scanning range are both a scanning range including a monitoring target as a scanning target. The low-density scanning range is a scanning range wider than the high-density scanning range.

Herein, a scanning density, a low scanning density, and a high scanning density are defined. The scanning density is also referred to as a spatial resolution of scanning. In other words, the scanning density is a density of distance measuring points per unit solid angle when the first fixed-point three-dimensional LiDAR scanner 11P emits laser light. Therefore, when this angle is relatively small, the scanning density is relatively high. When this angle is relatively great, the scanning density is relatively low. The low scanning density is a scanning density lower than the high scanning density.

The low-density point cloud is a point cloud generated by the first fixed-point three-dimensional LiDAR scanner 11P performing scanning in the low-density scanning range at the low scanning density.

The high-density point cloud is a point cloud generated by the first fixed-point three-dimensional LiDAR scanner 11P performing scanning in the high-density scanning range at the high scanning density.

The first point cloud acquisition unit 16 acquires the low-density point cloud from the first fixed-point three-dimensional LiDAR scanner 11P by controlling the first fixed-point three-dimensional LiDAR scanner 11P in such a way that the first fixed-point three-dimensional LiDAR scanner 11P performs scanning in the low-density scanning range at the low scanning density and generates the low-density point cloud.

The alignment unit 17 aligns the low-density point cloud and known three-dimensional shape data about a monitoring target with each other.

The scanning range determination unit 18 determines the high-density scanning range including the monitoring target in a scanning range and also being narrower than the low-density scanning range, based on a result of the alignment by the alignment unit 17.

The second point cloud acquisition unit 19 acquires the high-density point cloud from the first fixed-point three-dimensional LiDAR scanner 11P by controlling the first fixed-point three-dimensional LiDAR scanner 11P in such a way that the first fixed-point three-dimensional LiDAR scanner 11P performs scanning in the high-density scanning range at the high scanning density and generates the high-density point cloud.

The foreign body detection unit 20 detects a foreign body in contact with the monitoring target, based on the high-density point cloud and the aligned three-dimensional shape data. The foreign body is a foreign body left in the first monitoring region 2P of the runway 2. The foreign body is typically a foreign body having a thickness of about several centimeters, and is, for example, an asphalt piece, a concrete piece, a fuel tank lid, and a tool. The foreign body detected by the foreign body detection unit 20 does not include an aircraft during a takeoff and a landing by using the runway 2 and an aircraft while moving on the taxiway 3.

When the foreign body detection unit 20 detects the foreign body, the warning unit 21 typically notifies an operator of presence of the foreign body by using the LCD 12*e*.

Figure 4:
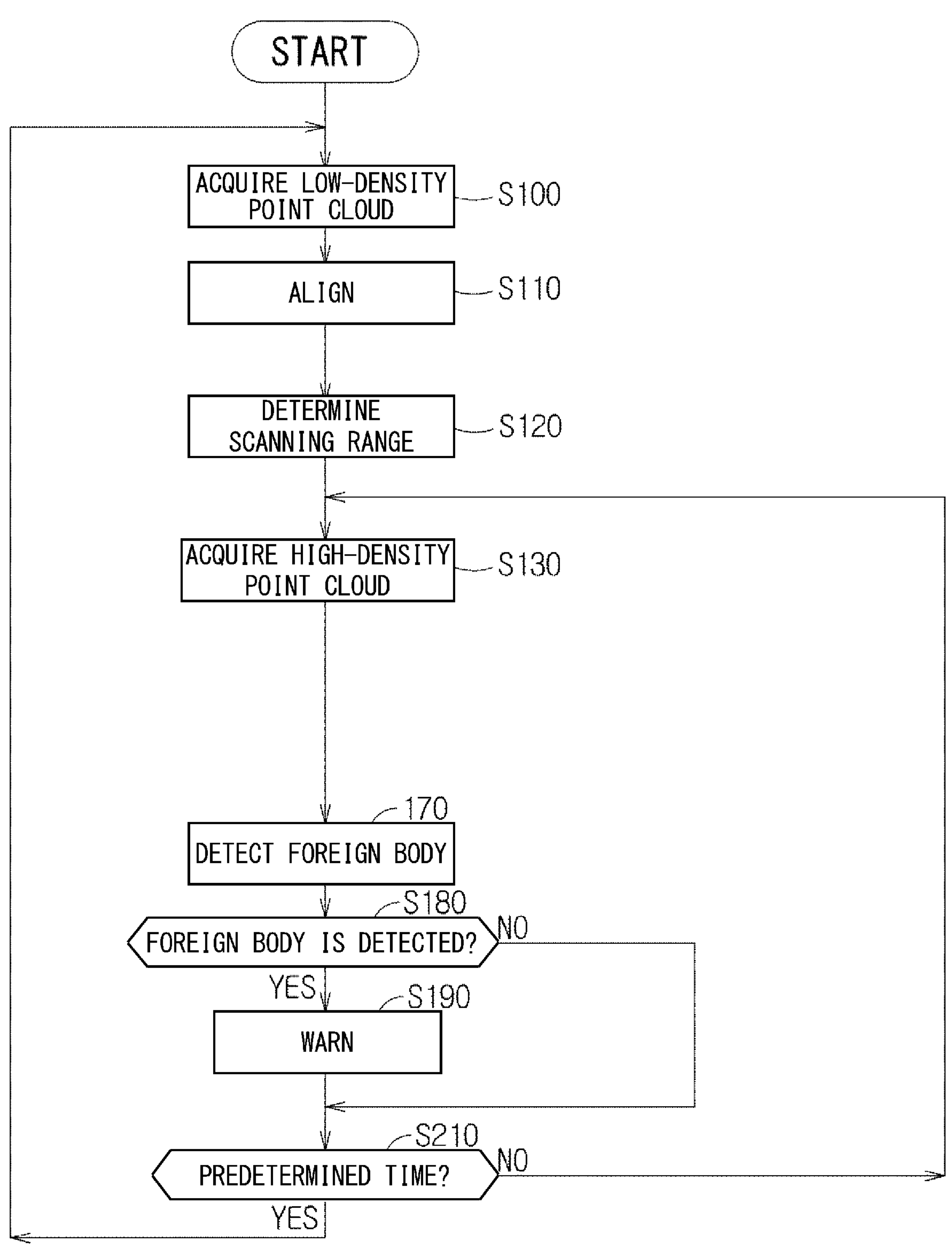
FIG. 4 is a control flow of a monitoring device (first example embodiment)
Figure 5:
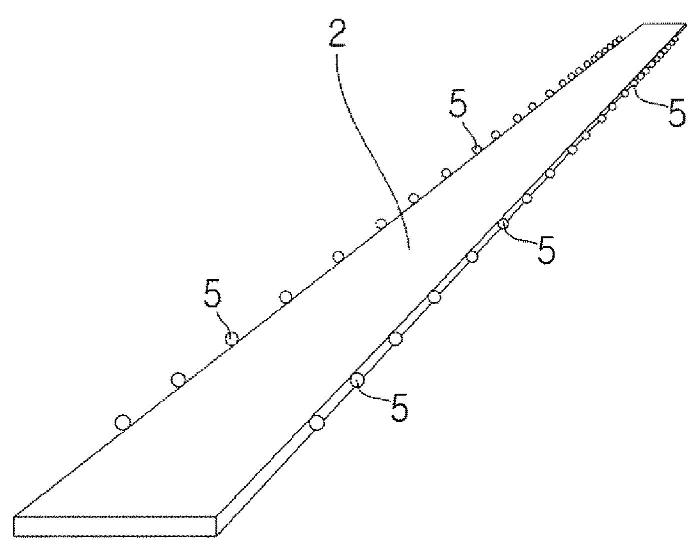
FIG. 5 is a bird's-eye view in which known three-dimensional shape data about a runway and a plurality of runway lights are visualized (first example embodiment)

Next, an operation of the monitoring device 12 will be described with reference to FIG. 4. FIG. 4 illustrates a control flow of the monitoring device 12. However, it is assumed that known three-dimensional shape data about a monitoring target are already stored in the data storage unit 15. FIG. 5 illustrates a bird's-eye view in which known three-dimensional shape data about the runway 2 and the plurality of runway lights 5 are visualized. The three-dimensional shape data illustrated in FIG. 5 are defined in a shape data coordinate system as the XYZ coordinate system.

S100:

Returning to FIG. 4, the first point cloud acquisition unit 16 controls the first fixed-point three-dimensional LiDAR scanner 11P in such a way that the first fixed-point three-dimensional LiDAR scanner 11P performs scanning in a low-density scanning range at a low scanning density and generates a low-density point cloud. The first point cloud acquisition unit 16 acquires the low-density point cloud generated by the first fixed-point three-dimensional LiDAR scanner 11P from the first fixed-point three-dimensional LiDAR scanner 11P, and stores the low-density point cloud in the data storage unit 15. A series of the processing by the first point cloud acquisition unit 16 is completed in an approximately few minutes.

Figure 6:
FIG. 6 is a bird's-eye view of a monitoring target when viewed from a first fixed-point three-dimensional LiDAR scanner (first example embodiment)
Figure 6:
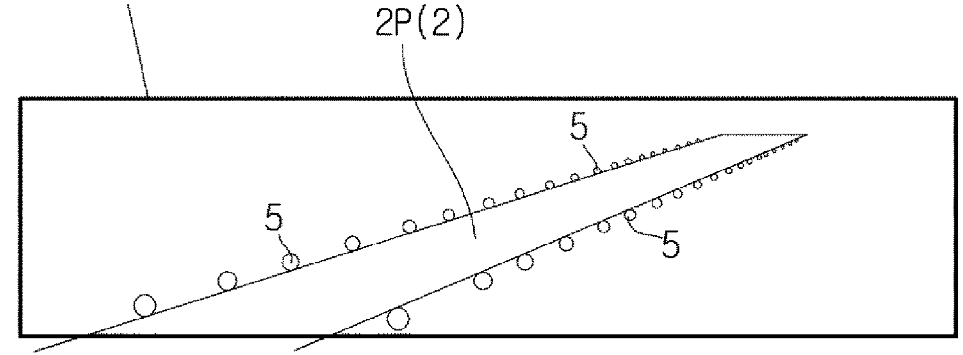
Figure 7:
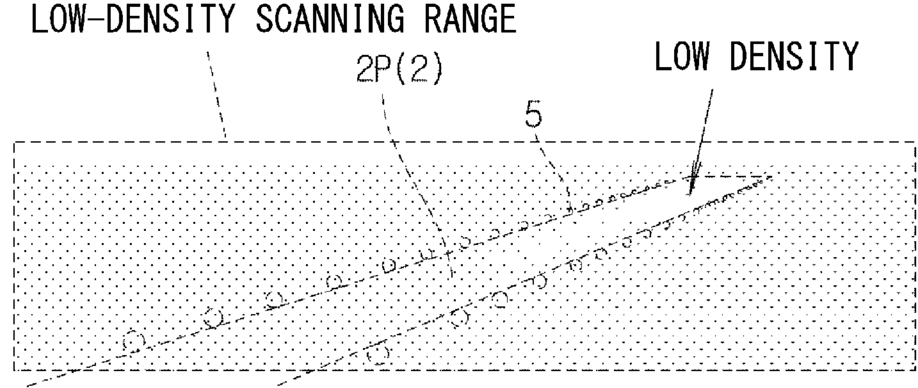
FIG. 7 is a bird's-eye view in which a low-density point cloud generated by the first fixed-point three-dimensional LiDAR scanner is visualized (first example embodiment)

Herein, FIG. 6 is referred. FIG. 6 illustrates a bird's-eye view of a monitoring target when viewed from the first fixed-point three-dimensional LiDAR scanner 11P. As indicated by a thick line in FIG. 6, a low-density scanning range is set to be sufficiently wide in such a way that a monitoring target is reliably included in a scanning range, and not only the monitoring target but also a peripheral region of the monitoring target is included in the scanning range. The low-density scanning range is a scanning range for scanning at least the monitoring target. Next, FIG. 7 is referred. FIG. 7 illustrates a bird's-eye view in which a low-density point cloud generated by the first fixed-point three-dimensional LiDAR scanner 11P controlled as described above is visualized. Note that a frame line of a monitoring target and a low-density scanning range is indicated by a broken line in FIG. 7 for promoting understanding. In FIG. 7, in a region of the first monitoring region 2P of the runway 2 being remote from the first fixed-point three-dimensional LiDAR scanner 11P, an incident angle of laser light irradiated from the first fixed-point three-dimensional LiDAR scanner 11P is small. Thus, back reflected light of the laser light is also extremely small, a point having a distance that cannot be measured increases, and thus a density of a point cloud decreases. Each point included in the low-density point cloud is typically defined in a scanner coordinate system as the XYZ coordinate system with the first fixed-point three-dimensional LiDAR scanner 11P as an origin. Note that a density of a point cloud generally decreases at a remoter place as described above, but, for a portion other than a road surface of a runway, intensity of back reflected light varies depending on a condition such as a lawn, asphalt, and concrete, and thus the portion other than the road surface is indicated at a unique cloud density in FIG. 7.

S110:

Next, the alignment unit 17 aligns the low-density point cloud and known three-dimensional shape data about a monitoring target with each other by using a known interactive closest point (ICP) matching algorithm and the like. At this time, the alignment unit 17 also generates coordinate transformation information for the alignment, and stores the generated coordinate transformation information in the data storage unit 15.

S120:

Next, the scanning range determination unit 18 determines a high-density scanning range including the monitoring target in a scanning range and also being narrower than the low-density scanning range, based on a result of the alignment by the alignment unit 17. The scanning range determination unit 18 stores the determined high-density scanning range in the data storage unit 15. The high-density scanning range is a scanning range for scanning at least the monitoring target.

In other words, whether a point included in the low-density point cloud indicates the monitoring target can be determined for each point from the result of the alignment by the alignment unit 17.

Specifically, coordinate transformation is performed on the point included in the low-density point cloud for each point by using the coordinate transformation information, and a shortest distance from the point after the coordinate transformation to the monitoring target defined in the three-dimensional shape data is obtained. Then, when the shortest distance is equal to or less than a predetermined value, the point can be estimated to be a point generated based on reflected light from the monitoring target, i.e., a point indicating the monitoring target.

On the contrary, a shortest distance from a point included in the low-density point cloud to the monitoring target defined in the three-dimensional shape data subjected to the coordinate transformation by using the coordinate transformation information is obtained for each point. Then, when the shortest distance is equal to or less than a predetermined value, the point can be estimated to be a point generated based on reflected light from the monitoring target, i.e., a point indicating the monitoring target.

In this way, aligning a point cloud with three-dimensional shape data and aligning three-dimensional shape data with a point cloud are substantially equivalent.

Figure 8:
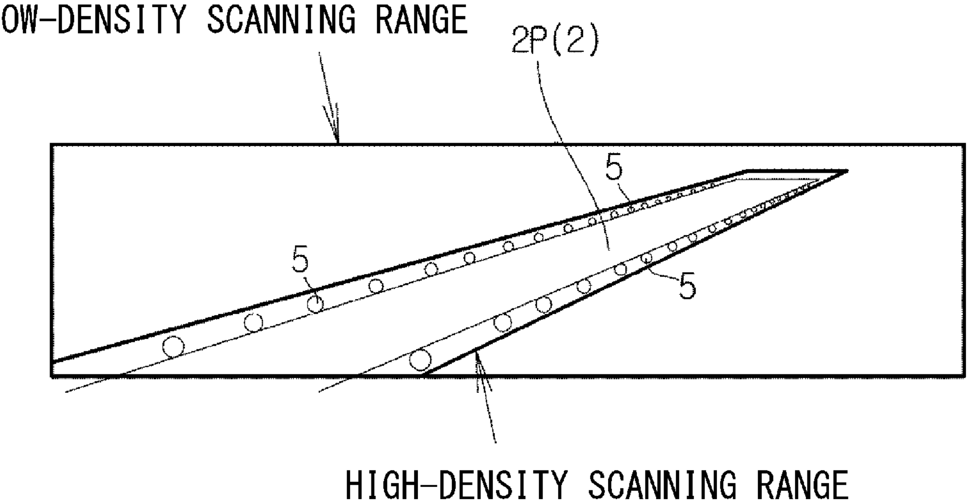
FIG. 8 is a diagram illustrating a comparison between a high-density scanning range and a low-density scanning range (first example embodiment)

Herein, FIG. 8 is referred. FIG. 8 indicates a high-density scanning range and a low-density scanning range by a thick line. As illustrated in FIG. 8, the scanning range determination unit 18 determines the high-density scanning range including a monitoring target in a scanning range and also being narrower than the low-density scanning range. In other words, the scanning range determination unit 18 determines the high-density scanning range in such a way that the high-density scanning range includes the monitoring target in a scanning range and does not include a region not being the monitoring target in a scanning range as much as possible. Frankly speaking, the scanning range determination unit 18 determines the high-density scanning range in such a way that the high-density scanning range rims the monitoring target.

S130:

Next, the second point cloud acquisition unit 19 controls the first fixed-point three-dimensional LiDAR scanner 11P in such a way that the first fixed-point three-dimensional LiDAR scanner 11P performs scanning in the high-density scanning range at a high scanning density and generates a high-density point cloud. Then, the second point cloud acquisition unit 19 acquires the high-density point cloud generated by the first fixed-point three-dimensional LiDAR scanner 11P from the first fixed-point three-dimensional LiDAR scanner 11P, and stores the high-density point cloud in the data storage unit 15. A series of the processing by the second point cloud acquisition unit 19 can be completed in approximately 10 minutes.

Figure 9:
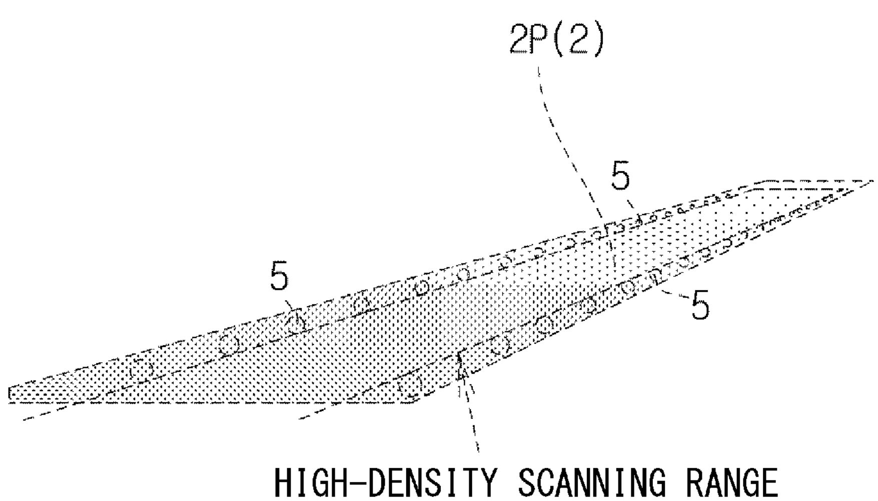
FIG. 9 is a bird's-eye view in which a high-density point cloud generated by the first fixed-point three-dimensional LiDAR scanner is visualized (first example embodiment)

Herein, FIG. 9 is referred. FIG. 9 illustrates a bird's-eye view in which a high-density point cloud generated by the first fixed-point three-dimensional LiDAR scanner 11P controlled as described above is visualized. Note that a frame line of a monitoring target and a high-density scanning range is indicated by a broken line in FIG. 9 for promoting understanding. As illustrated in FIG. 9, in a region of the first monitoring region 2P of the runway 2 being remote from the first fixed-point three-dimensional LiDAR scanner 11P, an incident angle of laser light irradiated from the first fixed-point three-dimensional LiDAR scanner 11P is small. Thus, back reflected light of the laser light is also extremely small, and a density of a point cloud decreases. Each point included in the high-density point cloud is defined in the scanner coordinate system similarly to the low-density point cloud.

Figure 10:
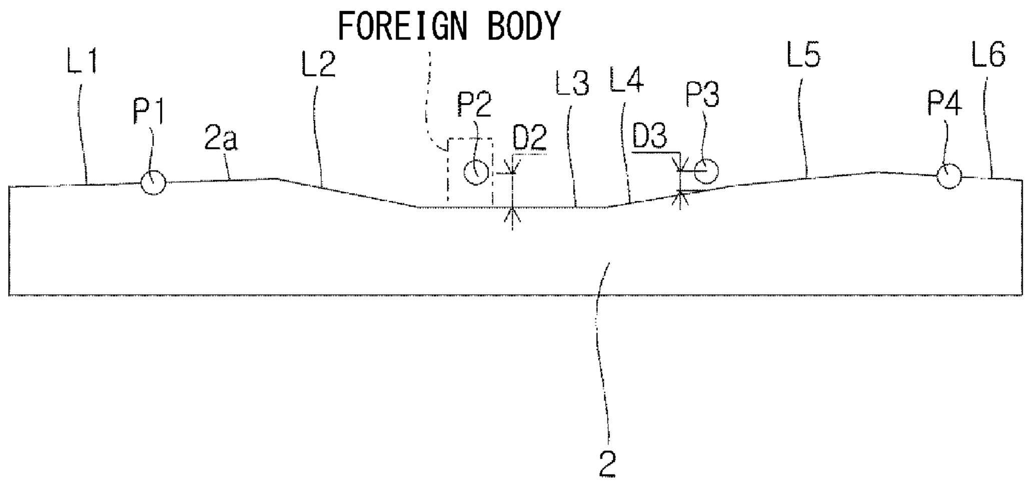
FIG. 10 is a cross-sectional view of a runway being cut by a plane orthogonal to a long-side direction of the runway (first example embodiment)

S170:

Next, the foreign body detection unit 20 detects a foreign body in contact with the monitoring target, based on the high-density point cloud and the three-dimensional shape data aligned with the low-density point cloud. One example of a detection algorithm of a foreign body is illustrated in FIG. 10. FIG. illustrates a cross-sectional view of the runway 2 being cut by a plane orthogonal to a long-side direction of the runway 2. Furthermore, FIG. 10 illustrates four points P1, P2, P3, and P4 included in the high-density point cloud. The runway 2 illustrated in FIG. 10 is defined by the three-dimensional shape data aligned with the high-density point cloud. As illustrated in FIG. 10, the road surface 2*a* of the runway 2 is expressed by a plurality of polygon L1, polygon L2, polygon L3, polygon L4, polygon L5, and polygon L6.

In FIG. 10, the point P1 and the point P4 are not separated upward from the road surface 2*a* of the runway 2, and match the road surface 2*a* of the runway 2. Therefore, the point P1 can be estimated to indicate the road surface 2*a* of the runway 2. In contrast, the point P2 and the point P3 are separated upward from the road surface 2*a* of the runway 2.

Deviation amounts of the point P2 and the P3 in an upward direction from the road surface 2*a* are assumed to be a deviation amount D2 and a deviation amount D3, respectively. When the deviation amount D2 and the deviation amount D3 exceed a predetermined value, the foreign body detection unit 20 estimates that the point P2 and the point P3 indicate a foreign body. The predetermined value is typically determined within a range of 0.5 centimeter to 1.0 centimeter. In FIG. 10, the deviation amount D2 is assumed to be 0.63 centimeter, and the deviation amount D3 is assumed to be 0.35 centimeter. In this case, the foreign body detection unit 20 estimates that the point P2 indicates a foreign body and the point P3 indicates the road surface 2*a* of the runway 2.

Figure 11:
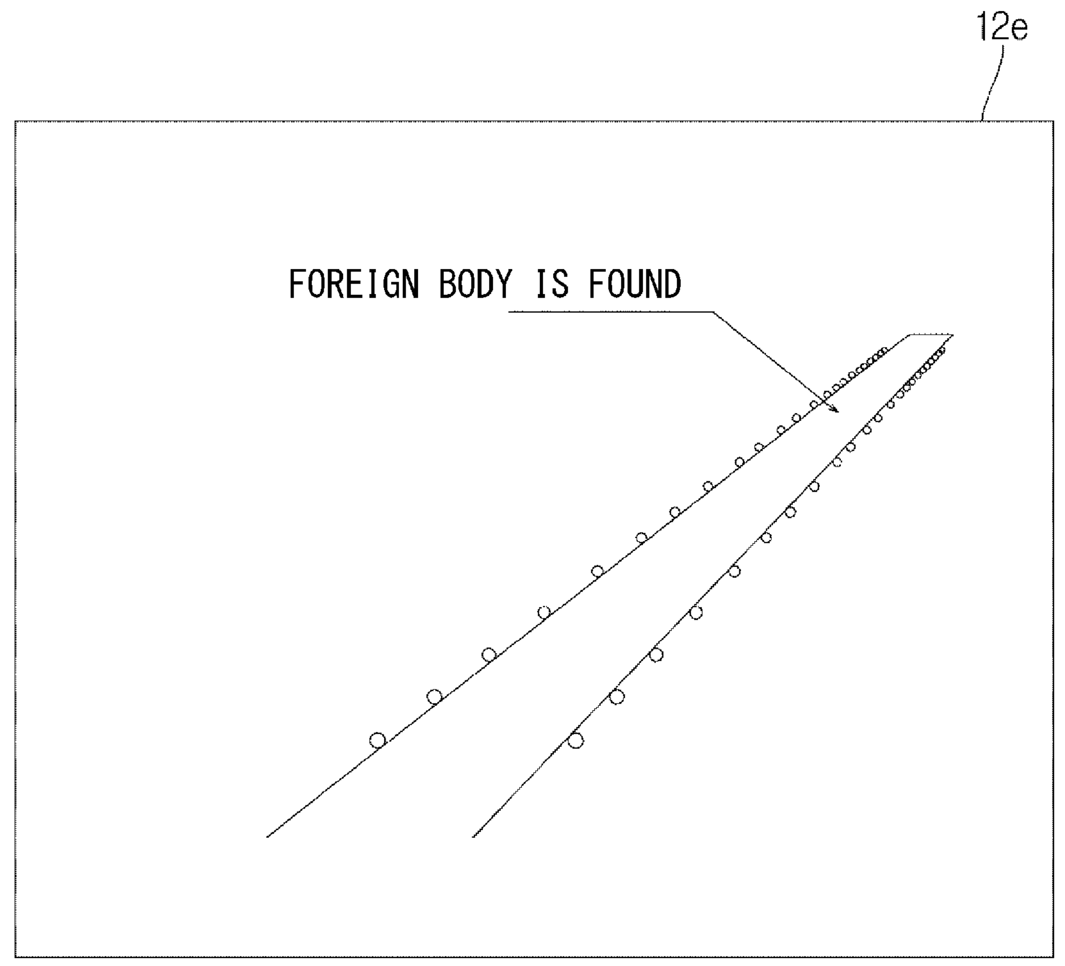
FIG. 11 is one example of a warning screen (first example embodiment)

S180 to S190:

When the foreign body detection unit 20 detects the foreign body (S180: YES), the warning unit 21 notifies an operator of presence of the foreign body (S190). FIG. 11 illustrates one example of a warning screen displayed on the LCD 12*e*. As illustrated in FIG. 11, the warning unit 21 visually notifies an operator of a position of the foreign body on the runway 2, based on position coordinates of the point P2. On the other hand, when the foreign body detection unit 20 does not detect the foreign body (S180: NO), the warning unit 21 proceeds the processing to S210.

S210:

The CPU 12*a* determines whether a current time is a predetermined time. When the determination result is YES, the CPU 12*a* returns the processing to S100, and, when the determination result is NO, the CPU 12*a* returns the processing to S130.

The first example embodiment is described above. In short, the first example embodiment described above has the following characteristics.

As illustrated in FIG. 3, the monitoring system 10 includes the first point cloud acquisition unit 16 (first point cloud acquisition means), the alignment unit 17 (alignment means), the scanning range determination unit 18 (scanning range determination means), and the second point cloud acquisition unit 19 (second point cloud acquisition means). The first point cloud acquisition unit 16 controls the first fixed-point three-dimensional LiDAR scanner 11P in such a way that the first fixed-point three-dimensional LiDAR scanner 11P performs scanning in a low-density scanning range (first scanning range) including a monitoring target in a scanning range and generates a low-density point cloud (first point cloud). In this way, the first point cloud acquisition unit 16 acquires the low-density point cloud from the first fixed-point three-dimensional LiDAR scanner 11P. The alignment unit 17 aligns the low-density point cloud and known three-dimensional shape data about the monitoring target with each other. The scanning range determination unit 18 determines a high-density scanning range (second scanning range) including the monitoring target in a scanning range and also being narrower than the low-density scanning range, based on a result of the alignment by the alignment unit 17. The second point cloud acquisition unit 19 controls the first fixed-point three-dimensional LiDAR scanner 11P in such a way that the first fixed-point three-dimensional LiDAR scanner 11P performs scanning in the high-density scanning range and generates a high-density point cloud (second point cloud). In this way, the second point cloud acquisition unit 19 acquires the high-density point cloud from the first fixed-point three-dimensional LiDAR scanner 11P.

According to the configuration described above, a time required for scanning can be shortened by narrowing a scanning range while it is guaranteed that a high-density scanning range includes a monitoring target in a scanning range, and thus a vast monitoring target can be inspected in a short time by using a fixed-point three-dimensional LiDAR scanner.

In other words, due to distortion of a frame structure that supports the first fixed-point three-dimensional LiDAR scanner 11P, and an environmental change and long-term deterioration of a movable portion for changing an emission direction of laser light emitted from a light source, it is difficult to stabilize the emission direction of the laser light. For example, when an emission direction of laser light is deviated by 1 degree from an assumed emission direction, the laser light being 1 kilometer ahead passes through a place being 17 m away from an assumed passage point. Therefore, when a scanning range tries to be narrowed down in order to shorten a scanning time, there is a risk that a monitoring target may fall outside the scanning range. To put it the other way around, a scanning range may need to be moderately narrowed down in such a way that a monitoring target is included in the scanning range.

In contrast, by aligning a low-density point cloud and known three-dimensional shape data about a monitoring target with each other in advance, a position of the monitoring target when viewed from the first fixed-point three-dimensional LiDAR scanner 11P can be accurately recognized. Therefore, when a scanning range is narrowed down in order to shorten a scanning time, the scanning range can be determined in such a way that a monitoring target does not fall outside the scanning range. Therefore, a time required for scanning can be shortened by narrowing a scanning range while it is guaranteed that a high-density scanning range includes a monitoring target in a scanning range, and thus a vast monitoring target can be inspected in a short time.

Note that, in step S210 illustrated in FIG. 4, when a current time is a predetermined time (S210: YES), the CPU 12*a* returns the processing to S100, and, when the current time is not the predetermined time (S210: NO), the CPU 12*a* returns the processing to S130. In other words, the low-density point cloud acquisition step (S100), the alignment step (S110), and the scanning range determination step (S120) are typically assumed to be performed once in a day. The reason is that, since an emission direction of laser light is stable in a short term, it is conceivably sufficient that the steps can be performed once in a day.

In the present example embodiment, the second point cloud acquisition unit 19 performs scanning in a high-density scanning range at a high scanning density. However, instead of this, the second point cloud acquisition unit 19 may perform scanning in a high-density scanning range at a low scanning density. Also in this case, a time required for scanning can be shortened by narrowing a scanning range while it is guaranteed that the high-density scanning range includes a monitoring target in a scanning range, and thus a vast monitoring target can be inspected in a short time.

Further, the first point cloud acquisition unit 16 controls the first fixed-point three-dimensional LiDAR scanner 11P in such a way that the first fixed-point three-dimensional LiDAR scanner 11P performs scanning in a low-density scanning range at a low scanning density. The second point cloud acquisition unit 19 controls the first fixed-point three-dimensional LiDAR scanner 11P in such a way that the first fixed-point three-dimensional LiDAR scanner 11P performs scanning in a high-density scanning range at a high scanning density being a density higher than the low scanning density. In this way, when a monitoring target is desired to be scanned at the high scanning density, the meaning of existence of the above-described technique for narrowing down a scanning range becomes clearer. In other words, by narrowing down a scanning range, an increase in time required for scanning even when a scanning density is set to be a high density can be suppressed. Further, it is needless to say that scanning a monitoring target at a high scanning density is advantageous for foreign body detection.

Further, the monitoring device 12 further includes the foreign body detection unit 20 that detects a foreign body in contact with a monitoring target, based on a high-density point cloud and three-dimensional shape data aligned with the high-density point cloud. According to the configuration described above, a foreign body in contact with a monitoring target can be detected with a high degree of reliability.

In other words, even when a high-density point cloud is acquired, an extremely small foreign body having a thickness of about 1 centimeter or 2 centimeters at most cannot be detected from comparison between high-density point clouds. The reason is that whether a point included in the high-density point cloud indicates a foreign body or indicates the road surface 2*a* itself cannot be clearly determined for each point. In contrast, as described above, by referring to three-dimensional shape data aligned with a high-density point cloud, whether a point included in the high-density point cloud indicates a foreign body or indicates the road surface 2*a* itself can be clearly determined for each point.

Particularly, the technical effect described above is particularly significant when a foreign body present at a remote place from the first fixed-point three-dimensional LiDAR scanner 11P is detected. The reason is that, as illustrated in FIG. 9, at a remote place from the first fixed-point three-dimensional LiDAR scanner 11P, a density of an acquired point cloud is low by all means, and a point is more likely to be isolated. In other words, when a density of a point cloud is high, there is a possibility that a foreign body can be detected by comparing adjacent point clouds. However, when a density of a point cloud is low, adjacent point clouds cannot be even compared with each other.

Further, in the present example embodiment, the plurality of runway lights are included as a monitoring target. In other words, in addition to the first monitoring region 2P of the runway 2, the plurality of runway lights 5 that rim the first monitoring region 2P are also included in a scanning range. The reason is that, as illustrated in FIG. 9, although reflected light from the runway 2 cannot be much expected from a remote place from the first fixed-point three-dimensional LiDAR scanner 11P, reflected light from the plurality of runway lights 5 can be sufficiently expected. As described above, since the plurality of runway lights 5 protrude upward from the road surface 2*a*, an incident angle of laser light emitted from the first fixed-point three-dimensional LiDAR scanner 11P with respect to each of the runway lights 5 is great, and distance measuring by the first fixed-point three-dimensional LiDAR scanner 11P succeeds with a high probability. Then, when a point cloud can be acquired even from a remote place from the first fixed-point three-dimensional LiDAR scanner 11P, an improvement in accuracy of alignment by the alignment unit 17 is accordingly greatly contributed.

For example, the first example embodiment described above can be modified as follows.

In other words, the monitoring device 12 may repeatedly perform the low-density point cloud step (S100) in a time period at night when a takeoff and a landing do not take place at the airport 1. Then, the alignment step (S110) may be performed by using an average of a plurality of sets of the low-density point cloud acquired from S100. In this way, an improvement in accuracy of alignment, i.e., an improvement in accuracy of coordinate transformation information can be expected.

Further, various functional units of the monitoring device 12 may be achieved by a single device, or may be achieved by distributed processing by a plurality of devices.

Second Example Embodiment

Hereinafter, a second example embodiment according to the present disclosure will be described with reference to FIGS. 12 and 13. Hereinafter, a difference between the present example embodiment and the first example embodiment described above will be mainly described, and duplicate description will be omitted.

Figure 12:
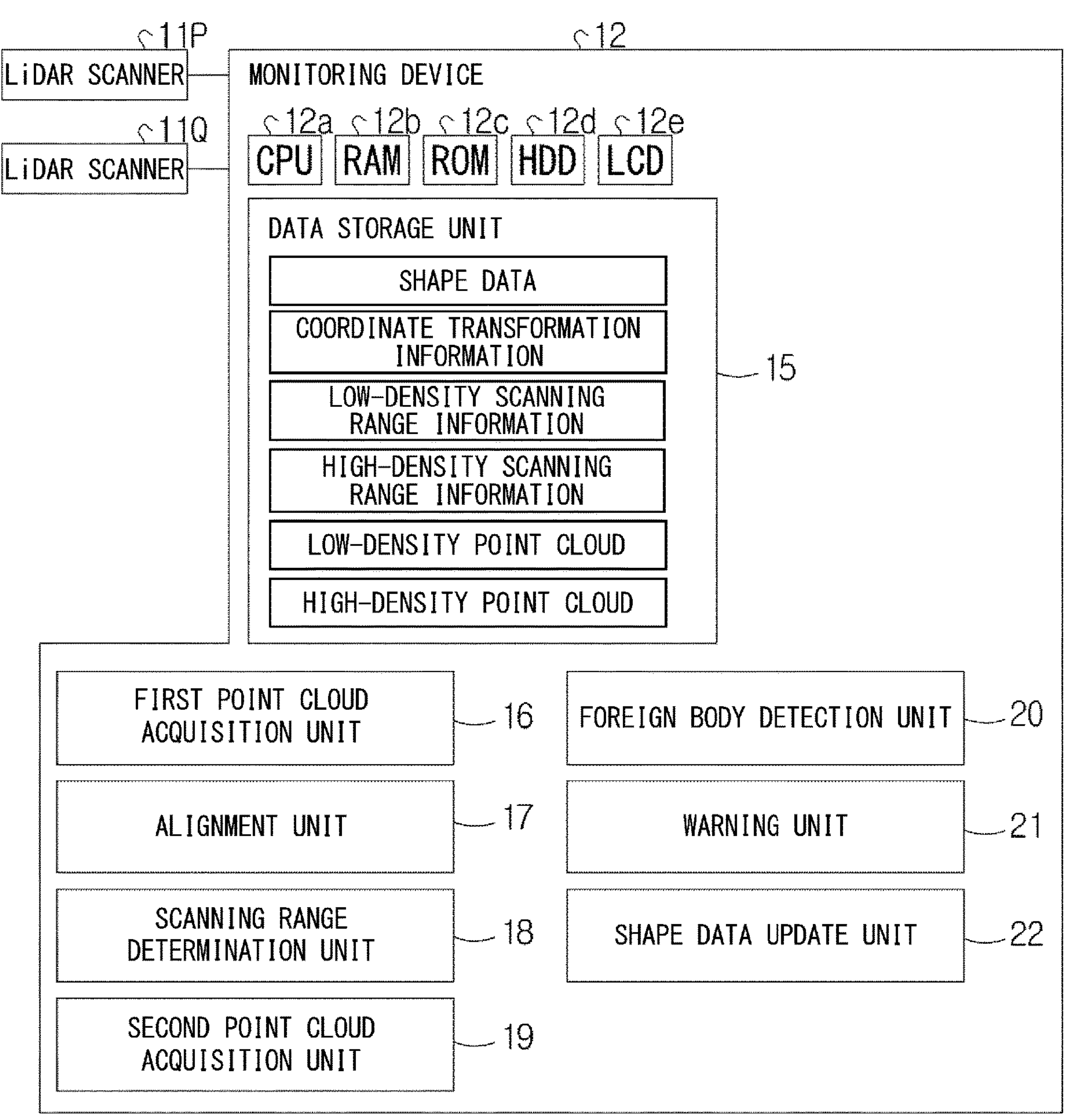
FIG. 12 is a functional block diagram of a monitoring system (second example embodiment)
Figure 13:
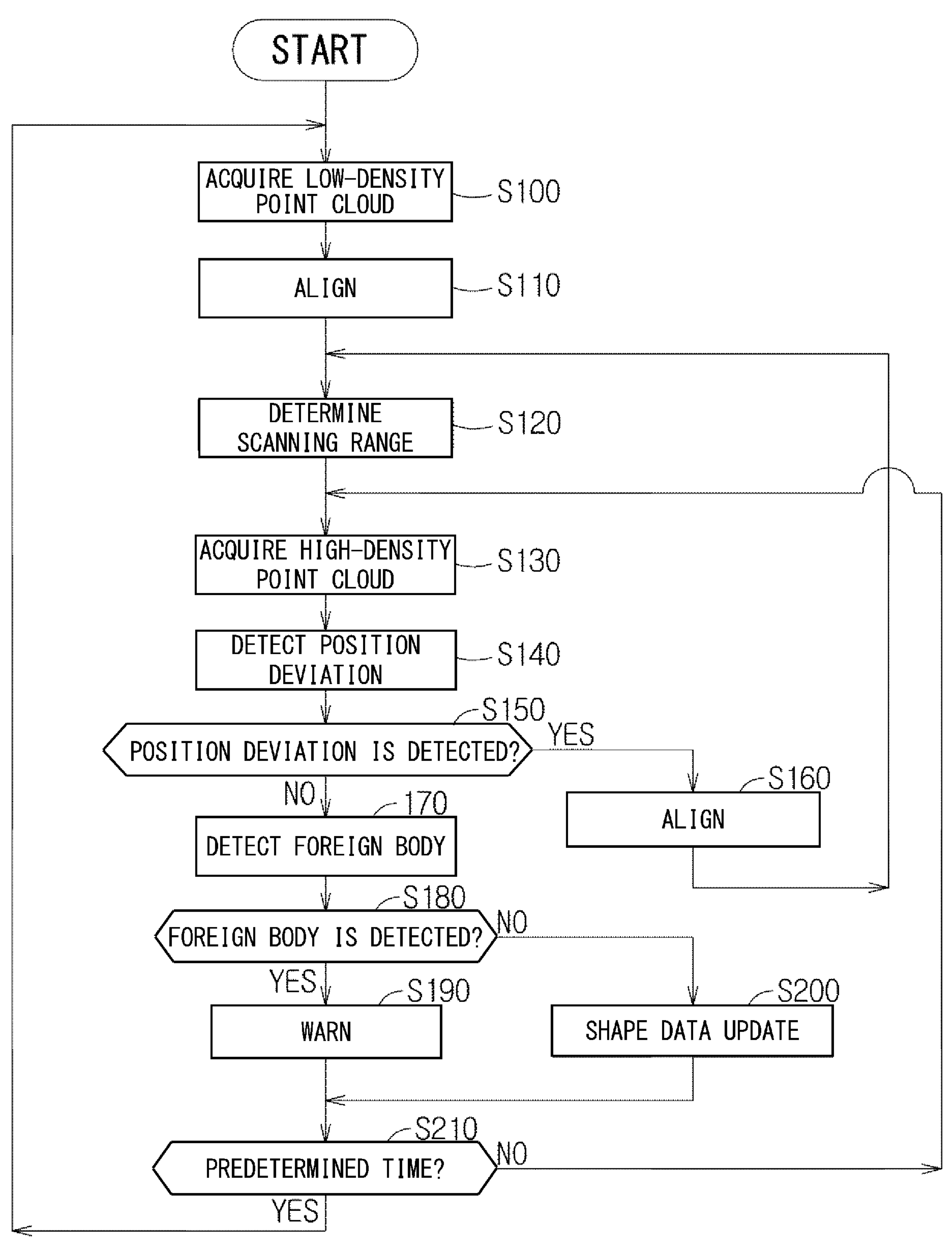
FIG. 13 is a control flow of a monitoring device (second example embodiment).

FIG. 12 illustrates a functional block diagram of a monitoring device 12. FIG. 13 illustrates a control flow of the monitoring device 12.

The monitoring device 12 according to the present example embodiment further includes a shape data update unit 22. The shape data update unit 22 updates three-dimensional shape data, based on a high-density point cloud.

In other words, a road surface 2*a* of a runway 2 may be locally dented due to repeated landings of an aircraft, and may be undulated due to long-term land subsidence. On the other hand, a second point cloud acquisition unit 19 acquires a high-density point cloud indicating the road surface 2*a* of the runway 2 by causing a first fixed-point three-dimensional LiDAR scanner 11P to scan the road surface 2*a* of the runway 2 at a high scanning density. Thus, the shape data update unit 22 updates three-dimensional shape data by using the high-density point cloud indicating the road surface 2*a* of the runway 2.

In this way, a foreign body can be prevented from being detected by mistake due to short-term and long-term deformation of the road surface 2*a* of the runway 2. However, when three-dimensional shape data are updated by a high-density point cloud generated while a foreign body is left on the runway 2, there is a risk that a foreign body detection unit 20 cannot detect the foreign body. Therefore, as illustrated in FIG. 13, the shape data update unit 22 typically operates as follows.

S200:

In other words, in step S180, only when the foreign body detection unit 20 does not detect a foreign body (S180: NO), the shape data update unit 22 updates three-dimensional shape data stored in a data storage unit 15, based on a high-density point cloud. Then, the shape data update unit 22 proceeds the processing to S210.

Further, in the present example embodiment, an alignment unit 17 further aligns the high-density point cloud and the three-dimensional shape data with each other.

In other words, as compared to a case where a low-density point cloud and the three-dimensional shape data are aligned with each other, when the high-density point cloud and the three-dimensional shape data are aligned with each other, an improvement in accuracy of alignment can be expected. The reason is that, in the high-density point cloud, a density of a point cloud in a remote region from the first fixed-point three-dimensional LiDAR scanner 11P is higher than that in the former case. As illustrated in FIG. 13, the alignment unit 17 typically operates as follows.

S140 to S160:

In other words, after a high-density point cloud acquisition step (S130), the alignment unit 17 compares the high-density point cloud and the aligned three-dimensional shape data, and detects a position deviation between them (S140). Specifically, the alignment unit 17 obtains, for each point of a point cloud of the high-density point cloud associated with a monitoring target, a shortest distance from the point to the monitoring target defined in the three-dimensional shape data aligned with the high-density point cloud. Next, the alignment unit 17 obtains an average value of the shortest distance of the point cloud of the high-density point cloud associated with the monitoring target, and determines that a position deviation between the high-density point cloud and the three-dimensional shape data when the average value exceeds a predetermined value.

When the position deviation between the high-density point cloud and the three-dimensional shape data is detected (S150: YES), the alignment unit 17 aligns the high-density point cloud and the three-dimensional shape data with each other (S160), and returns the processing to S120. At this time, the alignment unit 17 also generates coordinate transformation information for the alignment, and updates coordinate transformation information stored in the data storage unit 15 with the generated coordinate transformation information. The alignment unit 17 operates as described above, and thus an improvement in accuracy of alignment can be expected as described above. On the other hand, when the position deviation between the high-density point cloud and the three-dimensional shape data is not detected (S150: NO), the alignment unit 17 proceeds the processing to S170.

The first example embodiment and the second example embodiment described above give description for the purpose of monitoring a road surface of a runway. However, a monitoring target is not limited to a road surface of a runway. For example, by registering, as a different monitoring target, three-dimensional data about a runway being a reference, a high-density point cloud can be acquired in a short time and highly accurate monitoring can be performed for any monitoring target.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The first and second embodiments can be combined as desirable by one of ordinary skill in the art.

The whole or part of the exemplary embodiments disclosed above can be described as, but not limited to, the following supplementary notes.

(Supplementary Note 1)

A monitoring system including:

- a first point cloud acquisition means for acquiring a first point cloud by controlling a fixed-point three-dimensional LiDAR scanner in such a way that the fixed-point three-dimensional LiDAR scanner performs scanning in a first scanning range including a monitoring target in a scanning range and generates the first point cloud;
- an alignment means for aligning the first point cloud and known three-dimensional shape data about the monitoring target with each other;
- a scanning range determination means for determining a second scanning range including the monitoring target in a scanning range and also being narrower than the first scanning range, based on a result of the alignment; and
- a second point cloud acquisition means for acquiring a second point cloud by controlling the fixed-point three-dimensional LiDAR scanner in such a way that the fixed-point three-dimensional LiDAR scanner performs scanning in the second scanning range and generates the second point cloud.

(Supplementary Note 2)

The monitoring system according to Supplementary Note 1, wherein

- the first point cloud acquisition means controls the fixed-point three-dimensional LiDAR scanner in such a way that the fixed-point three-dimensional LiDAR scanner performs scanning in the first scanning range at a first scanning density, and
- the second point cloud acquisition means controls the fixed-point three-dimensional LiDAR scanner in such a way that the fixed-point three-dimensional LiDAR scanner performs scanning in the second scanning range at a second scanning density being a density higher than the first scanning density.

(Supplementary Note 3)

The monitoring system according to Supplementary Note 2, further including a three-dimensional shape data update means for updating the three-dimensional shape data, based on the second point cloud.

(Supplementary Note 4)

The monitoring system according to Supplementary Note 2, wherein the alignment means aligns the second point cloud and the three-dimensional shape data with each other.

(Supplementary Note 5)

The monitoring system according to Supplementary Note 2, further including a foreign body detection means for detecting a foreign body in contact with the monitoring target, based on the second point cloud and the aligned three-dimensional shape data.

(Supplementary Note 6)

The monitoring system according to Supplementary Note 1, wherein the monitoring target includes a runway or a taxiway.

(Supplementary Note 7)

The monitoring system according to Supplementary Note 6, wherein the monitoring target further includes a light.

(Supplementary Note 8)

The monitoring system according to Supplementary Note 5, wherein the monitoring target includes a runway or a taxiway, and the foreign body is a foreign body left on the runway or the taxiway.

(Supplementary Note 9)

A monitoring device including:

a first point cloud acquisition means for acquiring a first point cloud by controlling a fixed-point three-dimensional LiDAR scanner in such a way that the fixed-point three-dimensional LiDAR scanner performs scanning in a first scanning range including a monitoring target in a scanning range and generates the first point cloud;

an alignment means for aligning the first point cloud and known three-dimensional shape data about the monitoring target with each other;

a scanning range determination means for determining a second scanning range including the monitoring target in a scanning range and also being narrower than the first scanning range, based on a result of the alignment; and a second point cloud acquisition means for acquiring a second point cloud by controlling the fixed-point three-dimensional LiDAR scanner in such a way that the fixed-point three-dimensional LiDAR scanner performs scanning in the second scanning range and generates the second point cloud.

(Supplementary Note 10)

The monitoring device according to Supplementary Note 9, wherein the first point cloud acquisition means controls the fixed-point three-dimensional LiDAR scanner in such a way that the fixed-point three-dimensional LiDAR scanner performs scanning in the first scanning range at a first scanning density, and the second point cloud acquisition means controls the fixed-point three-dimensional LiDAR scanner in such a way that the fixed-point three-dimensional LiDAR scanner performs scanning in the second scanning range at a second scanning density being a density higher than the first scanning density.

(Supplementary Note 11)

The monitoring device according to Supplementary Note 10, further including a three-dimensional shape data update means for updating the three-dimensional shape data, based on the second point cloud.

(Supplementary Note 12)

The monitoring device according to Supplementary Note 10, wherein the alignment means aligns the second point cloud and the three-dimensional shape data with each other.

(Supplementary Note 13)

The monitoring device according to Supplementary Note 10, further including a foreign body detection means for detecting a foreign body in contact with the monitoring target, based on the second point cloud and the aligned three-dimensional shape data.

(Supplementary Note 14)

The monitoring device according to Supplementary Note 9, wherein the monitoring target includes a runway or a taxiway.

(Supplementary Note 15)

The monitoring device according to Supplementary Note 14, wherein the monitoring target further includes a light.

(Supplementary Note 16)

The monitoring device according to Supplementary Note 13, wherein the monitoring target includes a runway or a taxiway, and the foreign body is a foreign body left on the runway or the taxiway.

(Supplementary Note 17)

A monitoring method including, by a computer:

a step of acquiring a first point cloud by controlling a fixed-point three-dimensional LiDAR scanner in such a way that the fixed-point three-dimensional LiDAR scanner performs scanning in a first scanning range including a monitoring target in a scanning range and generates the first point cloud;

a step of aligning the first point cloud and known three-dimensional shape data about the monitoring target with each other;

a step of determining a second scanning range including the monitoring target in a scanning range and also being narrower than the first scanning range, based on a result of the alignment; and a step of acquiring a second point cloud by controlling the fixed-point three-dimensional LiDAR scanner in such a way that the fixed-point three-dimensional LiDAR scanner performs scanning in the second scanning range and generates the second point cloud.

(Supplementary Note 18)

The monitoring method according to Supplementary Note 17, further including:

in the step of acquiring a first point cloud, controlling the fixed-point three-dimensional LiDAR scanner in such a way that the fixed-point three-dimensional LiDAR scanner performs scanning in the first scanning range at a first scanning density; and, in the step of acquiring a second point cloud, controlling the fixed-point three-dimensional LiDAR scanner in such a way that the fixed-point three-dimensional LiDAR scanner performs scanning in the second scanning range at a second scanning density being a density higher than the first scanning density.

(Supplementary Note 19)

The monitoring method according to Supplementary Note 18, further including, by the computer, a step of updating the three-dimensional shape data, based on the second point cloud.

(Supplementary Note 20)

The monitoring method according to Supplementary Note 18, further including, in the step of aligning, aligning the second point cloud and the three-dimensional shape data with each other.

(Supplementary Note 21)

The monitoring method according to Supplementary Note 18, further including, by the computer, a step of detecting a foreign body in contact with the monitoring target, based on the second point cloud and the aligned three-dimensional shape data.

(Supplementary Note 22)

The monitoring method according to Supplementary Note 17, wherein the monitoring target includes a runway or a taxiway.

(Supplementary Note 23)

The monitoring method according to Supplementary Note 22, wherein the monitoring target further includes a light.

(Supplementary Note 24)

The monitoring method according to Supplementary Note 21, wherein the monitoring target includes a runway or a taxiway, and the foreign body is a foreign body left on the runway or the taxiway.

(Supplementary Note 25)

A program for causing a computer to function as:

a first point cloud acquisition means for acquiring a first point cloud by controlling a fixed-point three-dimensional LiDAR scanner in such a way that the fixed-point three-dimensional LiDAR scanner performs scanning in a first scanning range including a monitoring target in a scanning range and generates the first point cloud;

an alignment means for aligning the first point cloud and known three-dimensional shape data about the monitoring target with each other;

a scanning range determination means for determining a second scanning range including the monitoring target in a scanning range and also being narrower than the first scanning range, based on a result of the alignment; and a second point cloud acquisition means for acquiring a second point cloud by controlling the fixed-point three-dimensional LiDAR scanner in such a way that the fixed-point three-dimensional LiDAR scanner performs scanning in the second scanning range and generates the second point cloud.

(Supplementary Note 26)

The program according to Supplementary Note 25, wherein the first point cloud acquisition means controls the fixed-point three-dimensional LiDAR scanner in such a way that the fixed-point three-dimensional LiDAR scanner performs scanning in the first scanning range at a first scanning density, and the second point cloud acquisition means controls the fixed-point three-dimensional LiDAR scanner in such a way that the fixed-point three-dimensional LiDAR scanner performs scanning in the second scanning range at a second scanning density being a density higher than the first scanning density.

(Supplementary Note 27)

The program according to Supplementary Note 26, further including a three-dimensional shape data update means for updating the three-dimensional shape data, based on the second point cloud.

(Supplementary Note 28)

The program according to Supplementary Note 26, wherein the alignment means aligns the second point cloud and the three-dimensional shape data with each other.

(Supplementary Note 29)

The program according to Supplementary Note 26, further including a foreign body detection means for detecting a foreign body in contact with the monitoring target, based on the second point cloud and the aligned three-dimensional shape data.

(Supplementary Note 30)

The program according to Supplementary Note 25, wherein the monitoring target includes a runway or a taxiway.

(Supplementary Note 31)

The program according to Supplementary Note 30, wherein the monitoring target further includes a light.

(Supplementary Note 32)

The program according to Supplementary Note 29, wherein the monitoring target includes a runway or a taxiway, and the foreign body is a foreign body left on the runway or the taxiway.

According to the present disclosure, a vast monitoring target can be inspected in a short time by using a fixed-point three-dimensional LiDAR scanner.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A monitoring system for controlling and operating a LiDAR scanner, the monitoring system comprising at least one memory storing computer-executable instructions; and at least one processor configured to access the at least one memory and execute the computer-executable instructions to:

control a fixed-point three-dimensional LiDAR scanner in such a way that the fixed-point three-dimensional LiDAR scanner performs scanning in a first scanning range for scanning at least a monitoring target and generating a first point cloud, the scanning in the first scanning range being performed at a first scanning density;

align the first point cloud and known three-dimensional shape data about the monitoring target with each other;

determine a second scanning range for scanning at least the monitoring target, the second scanning range being narrower than the first scanning range, based on a result of the alignment; and control the fixed-point three-dimensional LiDAR scanner in such a way that the fixed-point three-dimensional LiDAR scanner performs scanning in the second scanning range that is narrower than the first canning range and generating a second point cloud, the scanning in the second scanning range being performed at a second scanning density that is higher than the first scanning density.

2. The monitoring system according to claim 1, wherein the at least one processor is further configured to execute the instructions to:

update the three-dimensional shape data, based on the second point cloud.

3. The monitoring system according to claim 1, wherein the at least one processor is further configured to execute the instructions to:

align the second point cloud and the three-dimensional shape data with each other.

4. The monitoring system according to claim 1, wherein the at least one processor is further configured to execute the instructions to:

detect a foreign body in contact with the monitoring target, based on the second point cloud and the aligned three-dimensional shape data.

5. The monitoring system according to claim 1, wherein the monitoring target includes a runway or a taxiway.

6. The monitoring system according to claim 5, wherein the monitoring target further includes a light.

7. The monitoring system according to claim 4, wherein the monitoring target includes a runway or a taxiway, and the foreign body is a foreign body left on the runway or the taxiway.

8. A monitoring device for controlling and operating a LiDAR scanner, the monitoring device comprising at least one memory storing computer-executable instructions; and at least one processor configured to access the at least one memory and execute the computer-executable instructions to:

control a fixed-point three-dimensional LiDAR scanner in such a way that the fixed-point three-dimensional LiDAR scanner performs scanning in a first scanning range for scanning at least a monitoring target and generating a first point cloud, the scanning in the first scanning range being performed at a first scanning density;

align the first point cloud and known three-dimensional shape data about the monitoring target with each other;

determine a second scanning range for scanning at least the monitoring target, the second scanning range being narrower than the first scanning range, based on a result of the alignment; and control the fixed-point three-dimensional LiDAR scanner in such a way that the fixed-point three-dimensional LiDAR scanner performs scanning in the second scanning range that is narrower than the first canning range and generating a second point cloud, the scanning in the second scanning range being performed at a second scanning density that is higher than the first scanning density.

9. A computer-implemented monitoring method performed by a computer for controlling and operating a LiDAR scanner, the monitoring method comprising:

controlling a fixed-point three-dimensional LiDAR scanner in such a way that the fixed-point three-dimensional LiDAR scanner performs scanning in a first scanning range for scanning at least a monitoring target and generating a first point cloud the scanning in the first scanning range being performed at a first scanning density;

aligning the first point cloud and known three-dimensional shape data about the monitoring target with each other;

determining a second scanning range for scanning at least the monitoring target, the second scanning range being narrower than the first scanning range, based on a result of the alignment; and controlling the fixed-point three-dimensional LiDAR scanner in such a way that the fixed-point three-dimensional LiDAR scanner performs scanning in the second scanning range that is narrower than the first canning range and generating a second point cloud, the scanning in the second scanning range being performed at a second scanning density that is higher than the first scanning density.

10. A non-transitory computer readable medium storing a program for controlling and operating a LiDAR scanner and causing a computer to execute the computer-implemented monitoring method according to claim 9.

* * * * *